Sept. 23, 1947.        C. J. TURANSKY ET AL        2,427,885
           SAFETY LOCK FOR RETRACTABLE LANDING GEAR
                Filed Jan. 29, 1945        2 Sheets-Sheet 2
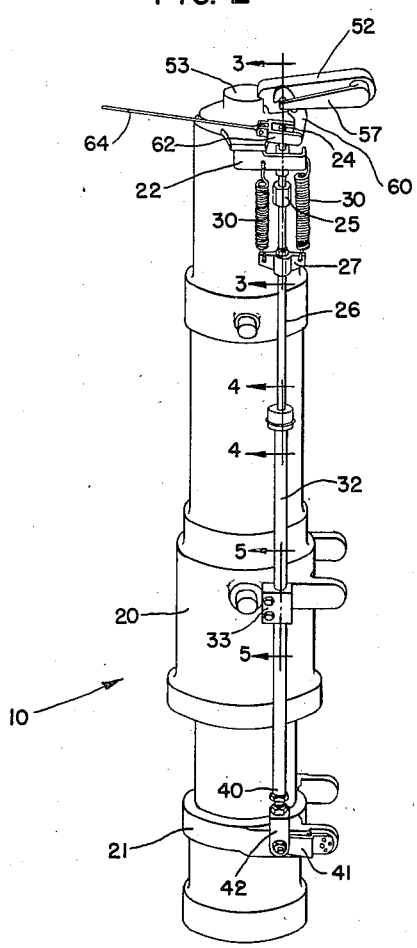

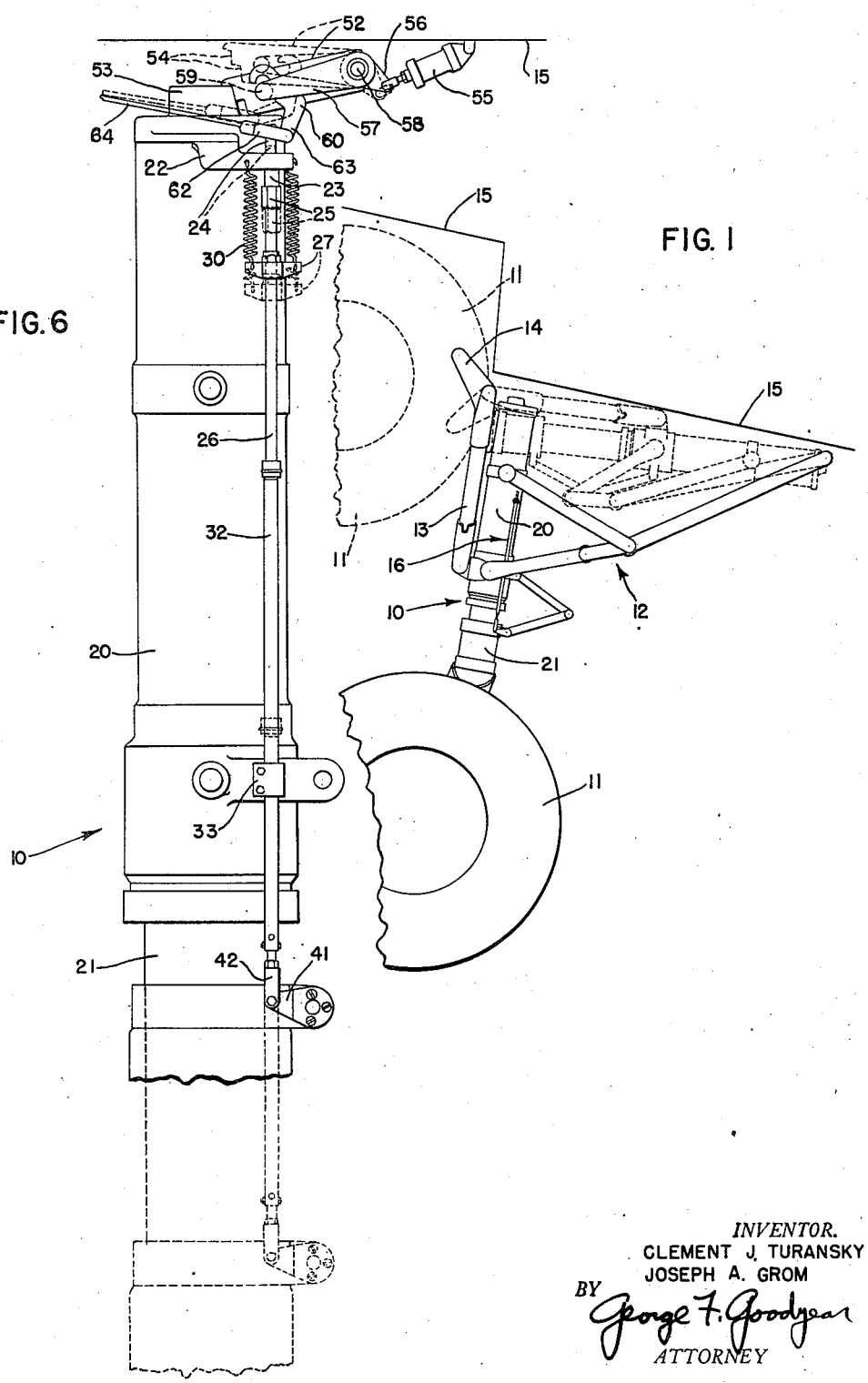

Patented Sept. 23, 1947

2,427,885

UNITED STATES PATENT OFFICE 2,427,885

SAFETY LOCK FOR RETRACTABLE LANDING GEAR

Clement J. Turansky, Kenmore, and Joseph A. Grom, Tonawanda, N. Y., assignors to Curtiss-Wright Corporation, a corporation of Delaware Application January 29, 1945, Serial No. 575,102

7 Claims. (Cl. 244—102)

1

This invention is directed to improvements in aircraft landing gear locking systems and is particularly concerned with a novel locking mechanism which shall be effective to prevent accidental retracting movement of landing gears.

A principal object of this invention is to provide a locking system for landing gears which will remain in a locked position until the weight of the aircraft has been removed from the gear and the shock strut member has attained substantially its fully expanded condition.

Another object is to be found in the arrangement of a locking mechanism for a landing gear such that movement of the strut member in response to the application or removal of load will serve to operate the mechanism, thus assuring positive and correct operation thereof.

Still another object resides in the disposition of a landing gear latch releasing means for engagement by the locking mechanism whereby inadvertent latch release will be prevented.

Further objects and advantages will be pointed out during the course of the following detailed description of a preferred embodiment of the invention as disclosed in the accompanying drawing, in which:

Figure 1 is a schematic side elevational view of a landing gear assembly in connection with which the present invention will be described, certain portions of the locking system being omitted here but more fully shown in other views.

Figure 2 is an enlarged perspective view of the landing gear shock strut with the locking system shown in its locking position, this view assuming a load to be carried by the strut, Figure 3 is a greatly enlarged, fragmentary sectional detail of the latch lock means taken at line 3—3 in Figure 2, Figure 4 is another fragmentary and enlarged sectional detail of another portion of the locking means as viewed at line 4—4 of Figure 2, Figure 5 is also an enlarged fragmentary sectional detail view at line 5—5 of Figure 2, and Figure 6 is a greatly magnified side elevational view of the locking mechanism carried by the strut and the aricraft, the locked position being indicated by full lines and the unlocked position by dotted lines.

In the drawing, the landing gear includes a shock strut 10, wheel 11, bracing and folding link members 12, retracting and extending arm 13 and the crank arm 14 to which a hydraulic unit (not shown) may be connected. The gear recess or pocket adapted to receive the gear when retracted is indicated only partially by the line 15, which line represents a fixed structure of the aircraft such as a bulk head, closure wall or other structure. In Figure 1 these parts are shown in extended and retracted relationship with respect to the structure 15. The locking means, in this view, has been partially indicated at 16 since its details are disclosed in the remaining view hereinafter to be described.

The present invention has been applied to a landing gear assembly in which the shock strut or oleo member 10, the same comprising a cylinder structure 20 and a telescoping piston member 21, is movable in space between its extended and retracted positions as clearly indicated in Figure 1. The more usual arrangement is to have this strut pivot about some fixed member so that the wheel describes an arcuate path of movement. While the principles of this invention are advantageously disclosed in the present example, it must also be understood that the same will apply in the case of a more conventional landing gear assembly.

Turning now to Figure 2 and the enlarged detail thereof, the locking mechanism includes a bracket 22 secured at the upper closed end of the cylinder 20, the bracket having a tubular guide boss 23 formed thereon to receive and guide a locking element or rod member 24. The lower enlarged end 25 of the element 24 forms a stop to determine the upper limit of travel of the same. A tubular member or rod 26 is threaded into the enlargement 25 and also carries in spaced relation from the enlargement a threaded cross arm member 27, the latter being prevented from movement by a hold down nut 28. The locking element 24 is urged into locking position at all times by means of a pair of springs 30 the ends of which are anchored in the bracket 22 and cross arm 27 as shown.

The tubular member rod 26 extends along the cylinder 20 and is telescoped within a second tubular member 32 for a substantial part of its length. The lower end of the inner rod 26 terminates in the vicinity of a guide block 33 which is fixed on the cylinder 20 in position to receive and guide tube 32 in its movement with respect thereto. A short collar or sleeve element 34 is secured to the lower end of member 26 by a diametral pin 35 and provides an upwardly facing shouldered surface 36 for cooperation with a spaced, shouldered surface 37 formed by a second sleeve 38 secured to the outer tube 32. Tubular members 26 and 32 are relatively movable in a longitudinal direction so that when the shoulder formations 36 and 37 are in contact further movement of one member will act to move the other member with it. However, there is a considerable amount of lost motion between these members before the shouldered surfaces attain an engaged position as will be explained more fully.

The outer telescoping member 32 extends downwardly through guide block 33 and is secured at its lower end 40 to the piston member 21 by a bracket means 41 and connector link 42. Accordingly, the member 32 is constrained to move or slide in guide block 33 with the piston and hence transmits its movement to the telescoped member 26 through contact of the sleeve elements 34 and 38. Extending movement of the piston 21 will therefor eventually cause the sleeve elements to cooperate and draw the telescoped member 26 downwardly against the restraining action of the resilient means 30. The upper end (Figure 4) of the tubular member 32 is closed to ingress of dirt and foreign matter by an arrangement of a cap 45 threaded over an insert element 46 in turn threaded on the upper end of the sleeve 38. A wiper element 47 of suitable material is retained in proper position by and between the upper annular faces of sleeve 38 and insert 46 and the inturned flanged portion 48 of the cap. A lock wire or suitable ring clip 49 encircles the cap and has an end 50 thereof fitted into a suitable aperture in the cap and also a slot in the insert to prevent unthreading or displacement of the assembly.

The means adapted to retain the landing gear in its extended position comprises a latch member 52 pivoted on the aircraft structure for movement toward or away from a position of engagement with a boss 53 formed at the upper end of the cylinder 20. The latch 52 may have one or more notches such as those indicated at 54 (see Figure 6) for engaging the boss 53, thus preventing the upper end of the shock strut 10 from swinging rearwardly to a collapsed position as will be evident by inspection of the gear assembly positions shown in Figure 1. This latch 52 is movable by gravity into latching position and operable out of latching position by means of a suitable fluid motor or hydraulic strut 55. The member 55 is mounted on the aircraft structure and is operably attached to a crank arm 56 on the latch so that as the strut extends the latch will move to its retracted position shown in dotted outline.

The latch 52 is further provided with a holddown means such as an arm 57 which is laterally spaced from the latch but secured thereto for movement about the latch pivot 58 with movement of the latch as shown in Figure 6. The outer free end of this arm is provided with a finger element 59 for cooperation with a pivoted hook 60 in securing the arm against upward motion. The hook 60 is suitably mounted on a fixed structure of the aircraft (not shown) for movement in a plane which lies in the center line of the lock element 24 before noted. Therefore, a yoke member 62 which is pivotally secured to the lower end 63 of the hook 60 is adapted to move into or away from a position to be engaged by the lock element 24. For this purpose a rod or cable 64 is attached to the yoke 62 and extends to an operating means (not shown) located conveniently to the pilot of the aircraft. As indicated in Figure 6 when the lock element 24 engages the yoke 62 the hook 60 is prevented from releasing its cooperating element 59 and thus prevents the latch member 52 from freeing the shock strut 10 for retracting operation.

Although the same is not shown here, it is contemplated that the fluid actuator 55 will be associated with the retracting means for the landing gear assembly in such a manner that the actuator 55 must first operate to raise the latch 52 before fluid can pass to the gear retracting means. The reverse sequence is not necessary since upon extension of the gear the boss 53 may automatically cam the latch 52 to raised position and thus move into its proper position, the latch dropping again to engage and secure the strut 10.

However, before the gear can be retracted the lock element 24 must be retracted to free the yoke 62 and hence permit hook 60 to be moved out of engagement with the latch hold-down arm 57 by a force applied on cable or rod 64. In order that the lock element 24 be retracted it is essential that the load on the shock strut be removed, either by jacking up the aircraft or by the attainment of a flight condition when the aircraft is completely air borne. In either case the shock strut 10 will be able to expand in length (the dotted line position of Figure 6) and thus cause members 26 and 32 to slide relative to each other. This relative sliding movement between members 26 and 32 will continue until the sleeve elements 34 and 38 respectively come into contact. Thereafter, member 26 will move with member 32 in a down direction and hence withdraw the lock element 24, as shown.

Contact between sleeves 34 and 38 is effected only after the strut 10 has expanded substantially to its full length or, as in the present case, when there remains approximately one inch of travel for complete expansion. This delayed action in withdrawing lock element 24 is important for it is necessary to assure the pilot of the aircraft that when the landing gear can be retracted it will immediately do so and not hit an obstruction or do material damage to structure adjacent the wheel well or other housing. Therefore, until the required strut expansion has been reached the lock element 24 will prevent release of the hook 60 and consequently latch 52 cannot be lifted to clear boss 53.

Upon landing of the aircraft or the application of load to the strut 10, the same will contract, thereby permitting return springs 30 to raise the lock element 24 into its yoke engaging position as shown in Figures 2 and 3, for example. Further contraction or shortening of the strut will merely cause sleeve elements 34 and 38 to move out of engagement and member 32 to telescope over member 26.

So long as the strut 10 supports a load sufficient to collapse the lock actuating members 26 and 32 and place lock 24 in position to prevent withdrawal of the yoke 62, the landing gear cannot possibly be retracted and result in damage to the aircraft. This is of considerable importance while the craft is being handled on the ground and when mechanics are effecting installations and repairs in the area of the cockpit controls.

Obviously, other advantages might be mentioned as well as modifications of structure, but the scope of the present invention will be limited only by the claims hereafter appearing.

What is claimed is:

1. The combination in an aircraft of a retractable landing gear assembly including means yieldable under ground load, releasable latch means for holding the landing gear assembly against retraction, pilot operated means movable between a position permitting and a position preventing release of said latch means, and means operated by said yieldable means and effective when the latter is under ground load to lock said pilot operated means in the position thereof which prevents release of said latch means.

2. The combination in an aircraft of a retractable landing gear assembly having a shock strut member which is bodily movable between positions of retraction and extension and is yieldable in a direction to change its length when in extended load supporting position, an element pivotally mounted on the aircraft for movement into engagement with the shock strut member to prevent bodily movement thereof when in load supporting position, releasable means adapted to secure said element in engagement with the strut member, and means carried by the strut member and responsive to its change in length for preventing or permitting release of said releasable means.

3. In a retractable landing gear assembly for aircraft, a shock strut yieldable as to length when in extended ground load supporting position, latch means engageable with said shock strut for maintaining the latter in its load supporting position, a releasable element operably adapted to secure said latch engaged, means normally urged in a direction to prevent release of said releasable element, and means responsive to change in length of said yieldable shock strut for moving said last mentioned means in a direction to permit release of said releasable element as ground load is removed from the gear assembly.

4. In a retractable landing gear assembly for aircraft, a shock strut yieldable as to length when in extended ground load supporting position, latch means engageable with said shock strut for maintaining the latter in its load supporting position, a releasable element operably adapted to secure said latch engaged, means for operating said releasable securing element, means normally urged in a direction to render said element operating means inoperative for effecting release of said releasable element, and means responsive to change in length of said yieldable shock strut for moving said last mentioned means in a direction to permit release of said releasable element as ground load is removed from the gear assembly.

5. In combination with a retractable landing gear shock strut for aircraft, the strut being yieldable under ground load, a latch element pivotally mounted for movement to engage said shock strut in its ground load position and prevent retracting movement thereof, manually operated means for securing said latch element in position to engage said shock strut or for releasing said latch element for movement out of such engagement to permit landing gear retraction, locking means actuatable to engage said manually operated means and prevent movement thereof out of latch element securing position, and means operated by the yielding ground load movement of said shock strut to actuate said locking means.

6. In a retractable landing gear assembly for aircraft, the combination of a shock absorbing means yieldable under ground load, pivoted latch means engageable with said shock absorbing means to prevent retraction, means to pivot said latch means into or out of engagement with said shock absorbing means, a hook element for holding said latch means in engagement with said shock absorbing means, and a lock mechanism operated by the yielding ground load movement of said shock absorbing means for locking said hook element in its latch holding relation.

7. In a retractable landing gear assembly for aircraft, the combination of a shock absorbing means yieldable under ground load, pivoted latch means engageable with said shock absorbing means to prevent retraction, means to pivot said latch means into or out of engagement with said shock absorbing means, a hook element for holding said latch means in engagement with said shock absorbing means, and a lock mechanism operated by the yielding ground load movement of said shock absorbing means for locking said hook element in its latch holding relation, said lock mechanism comprising a lock pin normally urged into position for locking said hook element, and a lock actuator means adapted to move in response to the yielding ground load movement of said shock absorbing movement.

CLEMENT J. TURANSKY.
JOSEPH A. GROM.

REFERENCES CITED

The following references are of record in the file of this patent:

UNITED STATES PATENTS

| Number | Name | Date |
|---|---|---|
| 2,101,611 | Dowty | Dec. 7, 1937 |